Nov. 11, 1941.   A. M. ALEXANDRESCU   2,261,931
PISTON AND RING CONSTRUCTION
Original Filed April 29, 1936
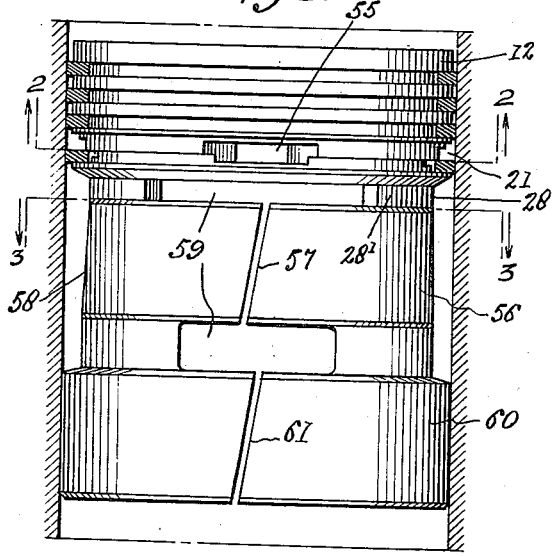
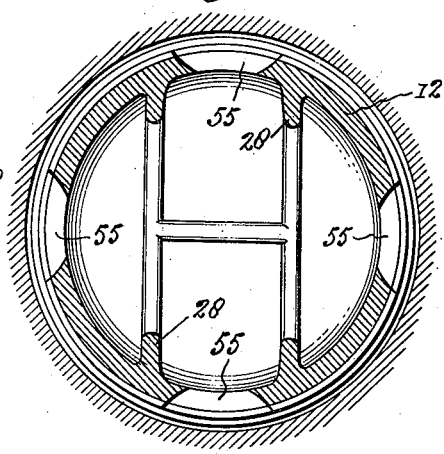
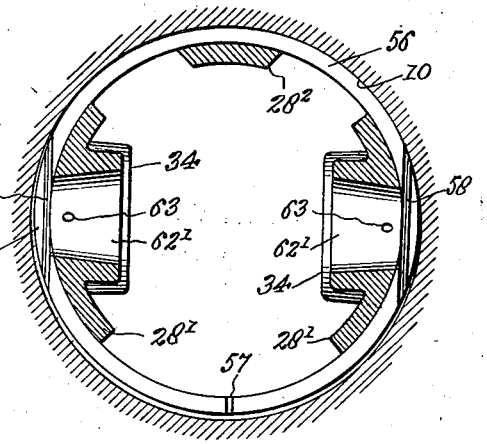
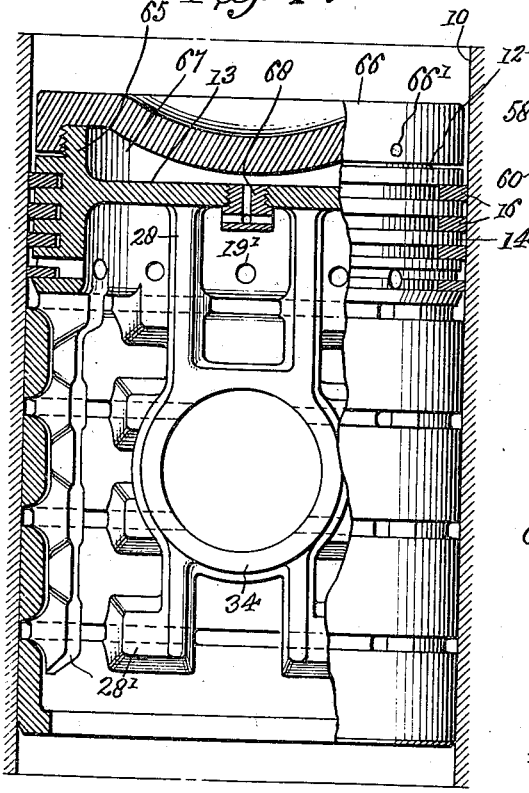
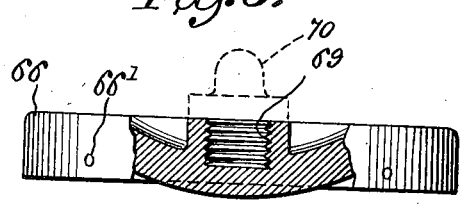
Inventor
A. M. Alexandrescu
By Wilkinson & Mawhinney
Attorneys.

Patented Nov. 11, 1941

2,261,931

UNITED STATES PATENT OFFICE 2,261,931

PISTON AND RING CONSTRUCTION

Alexander M. Alexandrescu, Cleveland, Ohio

Application April 29, 1936, Serial No. 77,036
Renewed June 15, 1939

2 Claims. (Cl. 309—10)

The present invention relates to a new and novel piston and ring construction for internal combustion engines, and has for an object to provide an improved piston and an arrangement of rings to cooperate therewith for effectively compressing the fuel or raw gas within the cylinder to maintain proper combustion, and likewise for controlling the passage of oil along with undesired fumes and smoke from within the cylinder through the piston into the crank case on the compression stroke of the same while permitting the oil to travel in a reverse direction on the opposite stroke of the piston for assuring the proper lubrication of these parts.

Another object of the present invention resides in providing a piston with an upper section having grooves cut therein to mount a plurality of compression rings and one or more oil rings below the same to engage the cylinder wall, and to permit the lower grooves of the piston to have openings or leadways cut therein to communicate with the interior of the piston whereby the oil may be passed back and forth from the cylinder into the piston.

A further object of the present invention is to provide an improved piston having an intermediate and lower section arranged to permit the passage of oil or lubricant therethrough for cooling the same, and likewise cut or slit along the outer wall of said sections to afford means for permitting the contraction and expansion of the sections under varying heating conditions when operated without injury to the piston and associated parts.

Another object of the present invention resides in providing an oil ring of a type wherein the top and outer circumferential walls are cut away and cooperate with the lower compression ring to form an enlarged chamber adjacent the cylinder for receiving and passing a quantity of oil therethrough during the operation of the piston and associated parts to properly cool and lubricate the same.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a front elevational view of the invention having only the intermediate section of the piston cut to permit contraction and expansion.

Figure 2 is a transverse sectional view taken along the line 2—2 of Figure 1.

Figure 3 is a transverse sectional view taken along the line 3—3 of Figure 1.

Figure 4 is a front elevational view with parts broken away of a modified form of the invention showing a removable cap carried upon the upper section of the piston.

Figure 5 is a detail view of a modified form of cap.

Referring more particularly to the drawing Figures 1, 2 and 3 illustrate a piston in which the bottom section 60 is provided with a slit 61. The intermediate section 56 and the bottom section 60 are shown shaped oval in Figure 3 of the drawing, but it is to be understood these sections can also be shaped round. The oval shaped type of bands or sections are formed with the diametrically disposed portions at right angles to the trunnions or bearings forming the widest or elongated portions of the sections. In having these sections oval a pair of diametrically disposed portions are provided to contact with the cylinder wall to coact with the compression and oil ring in the upper section to steady and hold the piston properly alined to operate. The oval sections likewise provide a pair of diametrically opposed portions which form a space between the outer surface of these bands or sections and the inner wall of the cylinder to permit the oil or lubricant to enter and to more readily keep the piston properly lubricated and cooled. The slots 55 formed in the upper section 12 of this type of the piston are elongated. Each of these slots have their lower edges in communication with the oil groove, and their upper edges placed to extend above the groove as shown. This arrangement of slots further reduces the number of openings to be cut through the wall of the upper section to prevent the lubricant from choking between the rings, and causing the leaking of the oil past the lower compression ring. The upper section is provided with the downwardly projecting lug or support $28^2$ which is diametrically disposed from the slot 57, and serves to transmit the heat from the rings to the lower sections or skirt where it is absorbed by the cylinder cooling system.

Figure 4 shows a modification of the piston and ring construction in which a cap 66 of cast iron is attached above the upper section or head 12' along with the intermediate and bottom sections or bands formed of a lighter material such as aluminum. It is advantageous to form the piston of these two metals, since the cast iron cap is especially adapted to give a maximum of resistance against burning or becoming worn under the excessive heat to which it is exposed, and the other sections of the piston formed of the lighter metal aluminum present an exceptionally slippery surface when lubricated and permit the piston to reciprocate freely within the cylinder with a minimum of friction between these parts. The cast iron cap 66 is screw threaded as shown to engage the screw threaded portion or upwardly projecting annulus formed in the upper section 12', and these parts are locked tightly to one another by the pins 66'. In large engines it has been previously found that cast iron will withstand the heat and that aluminum will melt, but by the construction now shown with the cooling system employed these difficulties are overcome by preventing the oil or lubricant from being burnt under the excessive heat from above. The plate or top 13 in the hopper section or head provides a means for stopping the upward movement of the oil and is spaced apart from the cap 66 to form the internal chamber 67. A plug 68 with an outlet therethrough is attached to the plate for permitting the escape of the heated gases from within the chamber 67 and allowing the same to pass downwardly through the sections of the piston whereby to assure the parts of the piston are kept properly cooled.

Figure 5 shows a slightly modified form of the cap 66 having the upwardly projecting portion 69 centrally located upon the upper face of the cap 66. The projection 69 is internally bored and threaded to receive the ignition member 70 as shown in dotted lines, and is formed from a metal composition which will become red hot and adapted for igniting the fuel when the same is properly placed under compression in crude oil engines.

It is obvious that various changes and modifications may be made in the details of construction and design of the above specifically described embodiment of this invention without distinguishing from the spirit thereof, such changes and modifications being restricted only by the scope of the following claims.

What is claimed is:

1. A piston comprising an upper section with an internal upper and lower chamber and having peripheral ring grooves in vertically spaced apart relation, the said upper section having openings passing therethrough to register with the lowermost groove, a cap mounted upon said upper section above said upper chamber, communicating means between said upper and lower chambers, a plurality of bands, and means supporting said bands below said upper section in spaced apart relationship.

2. A piston comprising an upper section with a top and side walls having peripheral ring grooves in vertically spaced apart relation, the said side walls having openings cut therethrough to register with the lowermost groove, a dish shaped cap, means connecting the cap to the upper section to provide a closed chamber between said cap and the top of the upper section, a plug mounted in the top of the upper section having an opening cut therethrough to provide communication between the interior of the upper section and said closed chamber below the cap, a plurality of bands, and means supporting said bands below the upper section in spaced apart relationship.

ALEXANDER M. ALEXANDRESCU.